Aug. 5, 1958     T. T. N. BUCHER     2,846,585
TEMPERATURE COMPENSATING DEVICE FOR FREQUENCY
DETERMINING CIRCUITS
Filed Feb. 7, 1956
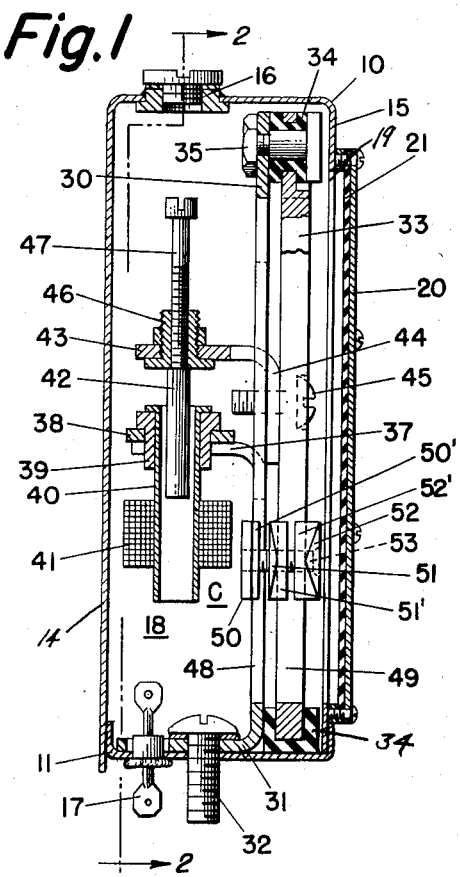
Fig.1
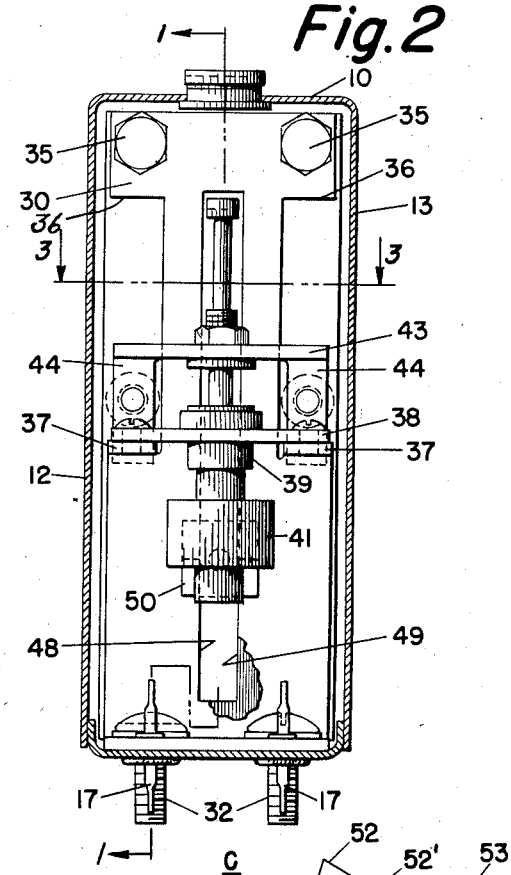
Fig.2
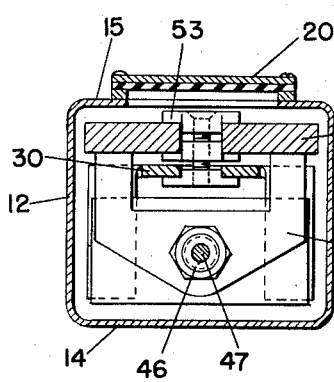
Fig.3
Fig.4
INVENTOR.
THOMAS T.N. BUCHER
BY George Sipkin
Edward W. Hughes
ATTORNEYS

United States Patent Office 2,846,585
Patented Aug. 5, 1958

2,846,585

TEMPERATURE COMPENSATING DEVICE FOR FREQUENCY DETERMINING CIRCUITS

Thomas T. N. Bucher, Moorestown, N. J., assignor, by mesne assignments, to the United States of America as represented by the Secretary of the Navy Application February 7, 1956, Serial No. 564,097

1 Claim. (Cl. 250—40)

This invention relates to frequency determining or selective circuits and in particular is concerned with a temperature compensating device which may be incorporated in a frequency determining or selective circuit in order to regulate the frequency of the circuit. This application is a commercial adaptation of the invention disclosed in my co-pending application, Temperature Coefficient Device, Serial No. 530,217, filed August 23, 1955.

Frequency determining or selective equipment in various circuits is affected by temperature variations to such an extent as to require changes in the setting of the components forming the equipment. Inductors and capacitors in oscillator circuits, for example, due to expansion and contraction of these elements require some provision for readjusting the physical relationship of their component parts.

It is known that these changes in structure which are due to temperature variations may be minimized by constructing the relatively movable parts of impedance members of materials having low temperature coefficients and also by constructing such parts of the equipment of materials having different coefficients in order to provide for temperature compensation. Ordinarily a manufacturer will try to choose one component having an opposite temperature coefficient to that of another component or to the aggregate of other components of an element in order to provide for temperature compensation. However, in the manufacture of such elements it is difficult to hold the tolerance of temperature coefficients closer than about ten parts per million per degree centigrade. To get closer compensation requires prohibitively expensive and laborious experimentation with various materials for the components. Other temperature compensation arrangements provide for the manual relative adjustment between the movable parts of an impedance member, for example, between the coil and core of an inductor or the electrodes of a capacitor.

The primary purpose of this invention is to provide a device for installation in a frequency determining or selective circuit which has both temperature compensating and manual adjustment characteristics.

The invention contemplates an air tight housing which encloses the movable parts of an impedance member in a manner to be relatively movable by manual adjustment, or by virtue of the difference in the expansion coefficients of the components of the impedance member. Independent supporting means is provided for each component and the various components are so arranged that the impedance device is readily assembled or disassembled and yet provides a compact and unitary structure which is readily incorporated in a frequency determining or selective circuit.

Although the following detailed description of the invention is in connection with its application to an inductor, it is to be understood that the general arrangement of the invention is equally applicable to a capacitor or other impedance assembly having relatively adjustable components.

Fig. 1 is a sectional view taken on the line 1—1 of Fig. 2;

Fig. 2 is a sectional view taken on the line 2—2 of Fig. 1;

Fig. 3 is a sectional view taken on the line 3—3 of Fig. 2; and

Fig. 4 is a view in perspective of a detail of the invention.

The device comprises a housing having top 10, bottom 11, side walls 12 and 13 with front and rear faces 14 and 15 respectively. A sealed access opening 16 is located in the top 10 and terminals 17—17 are provided in sealed openings in the bottom wall 11. The front face, side and top and bottom walls form a chamber 18 and are secured together in a manner to be air tight. The rear face 15, as shown, has an opening 19 which is sealed by a plate 20 and gasket means 21 by suitable screw connections. The chamber 18 is thus sealed to exclude external air and prevent or reduce variations in humidity.

At 30 is indicated the principal supporting member which extends vertically of the chamber 18 and has a horizontal extension 31 which is secured by soldering or welding to the bottom wall 11 and its upper end disposed adjacent and in spaced relation with the top 10. Screws 32 extend through the bottom wall for mounting the housing to a chassis and will be sealed to prevent entry of external air thereround and into the chamber 18. A plate 33 is mounted at its upper and lower ends in resilient channel members 34 and 34, and the support 30 and plate 33 are connected together at their upper ends by means of bolt and nut connections 35—35. The resilient channel members provide a spacing means for maintaining the support 30 and plate 33 in spaced relation with each other and also permit upward or downward expansion of the plate 33 within the chambers.

The principal support 30 has cut outs 36—36 at either side in its upper portion which are bent from the support and partially severed to provide horizontal arms 37—37. A horizontal plate 38 is supported on the arms 37 by suitable screw connections as shown in Fig. 2, and the plate 38 is apertured centrally to receive a bushing 39 which in turn supports an impedance member part or coil form 40 which carries a fixed coil 41. The other movable part of the impedance member or core 42 is aligned coaxially with the coil form 40 and is supported by means of a horizontal bracket member 43 which has a pair of depending legs 44 disposed in the space between the support 30 and plate 33 and are secured by screw means 45, to plate 33, as shown in Fig. 1. The bracket 43 is apertured to receive a bushing 46 which is provided with a screw threaded adjusting stud 47 carrying at its lower end the core member 42. The sealed opening 16 is aligned with the adjusting stud 47 and provides access for a tool for manually adjusting core 42 relative to the coil form 40.

The principal support 30 and the suspended plate 33 are provided with central vertical slots 48 and 49 respectively which coincide generally, and a clamping means C is provided to clamp the support and plate together. The coinciding slots 48 and 49 in the support and plate permit the clamping of these members together at any selected area vertically of the slots.

The clamping means C is shown in detail in Fig. 4 and is made up of one end nut plate 50 having a key 50' which is received by the slot or keyway 48 in plate 30. A central nut plate 51 is provided having a key 51' which is received in the slot or keyway 49 of plate 33 and another end nut plate 52 having a key 52' is provided. As shown in Fig. 1, the end nut plate 52 is positioned reversely to nut plate 51 and its key 52' is also received in slot 49 of plate 33. Additionally the nut plates 51 and 52 are also arranged to provide line clamping contacts with the body of plate 33 and to this end are provided with tapering faces which form edge portions 51" and 52" respectively. The clamp C is adjustably positioned relatively to the plate 33 by means of screw 53 while the line contact of the edges 51" and 52" of the clamping elements provides a confined or line clamping surface to provide for more constant performance than would be had if the clamping plates contacted greater surface areas of the highly expansible member 33.

The support 30, brackets 43 and the clamping elements 50, 51 and 52 are formed of materials having low coefficients of expansion while the plate 33 is formed of highly expansible material such as the commercial Textolite 1422. The position of the clamp C relative to the support and plate determines the degree of relative expansion between the support 30 and the plate 33 and hence the position of the core 42 relative to the coil 41. If the clamp C is disposed below screws 45, as is its position shown in the drawings, the plate 33 will expand upwardly to move core 42 out of coil form 40 with a consequent reduction in inductance. When clamp C is positioned above screws 45, the plate 33 will expand downwardly and will move core 42 into coil form 40 and thereby increase inductance. Hence either positive or negative temperature coefficient effects may be obtained. The magnitude of these effects, it will be understood, is dependent on the location of the clamp C with respect to the screws 45 and the relative expansion of the support members.

A device constructed as above described having support 30 and elements supported thereby, bracket 43 and elements carried thereby and also clamping elements 50, 51 and 52 formed of brass, coil form 40 formed of a phenolic material, and plate 33 formed of Textolite 1422, was built into an oscillator circuit at a frequency of 200 kc. The height of adjustment slots formed in the support 30 and the plate 33 was about 1.5 inches. A range of temperature coefficients in the oscillator circuit varied from approximately −18 p. p. m/° C. to +52.3 p. p. m./° C. This represents a range of about 70 p. p. m./° C. in frequency or about 140 p. p. m./° C. in inductance. The variation was linear with respect to the distance of clamp C from the bottom of the slots, and it was found possible to adjust the net coefficient of the oscillator circuit better than 1 p. p. m./° C. The abbreviation "p. p. m." as used in the specification will be understood to mean, "parts per million."

Obviously many modifications and variations of the present invention are possible in the light of the above teachings. It is therefore understood that within the scope of the appended claim the invention may be practiced otherwise than as specifically described.

What is claimed is:

A temperature compensating device for a frequency controlling circuit having coil and core impedance elements which comprises a housing formed of vertical side walls and upper and lower end walls, a fixed elongate support for the coil having its lower end secured to the lower end wall and its upper end positioned in spaced relation with the upper end wall of the housing, a movable elongate support for the core parallelly aligned with the fixed support and being constructed of material having a different coefficient of linear thermal expansion from that of the fixed support, connecting means for the upper ends of the supports, said connecting means permitting the movable support to expand upwardly and the lower end of the movable support being disposed in spaced relation with the lower end of the housing permitting the movable support to expand downwardly, coinciding vertical slots in said support, a clamp including a screw threaded shaft disposed within said slots and having threaded clamping lugs with narrow clamping edges for clamping the supports together at a selected transverse line of contact, means on said shaft to space the supports, said transverse line being selected to provide for movement of the core outward or away from the coil in accordance with the direction of expansion of the movable member.

References Cited in the file of this patent

UNITED STATES PATENTS

| | | |
|---|---|---|
| 1,616,622 | Horton | Feb. 8, 1927 |
| 1,913,978 | Ewen | June 13, 1933 |
| 2,028,596 | Franklin et al. | Jan. 21, 1936 |
| 2,100,412 | Scott | Nov. 30, 1937 |
| 2,109,880 | Dow | Mar. 1, 1938 |
| 2,439,809 | Hunter | Apr. 20, 1948 |